Jan. 28, 1941.  G. F. SWEDENBURG  2,229,685
RAT TRAP
Filed Dec. 6, 1939   2 Sheets-Sheet 2
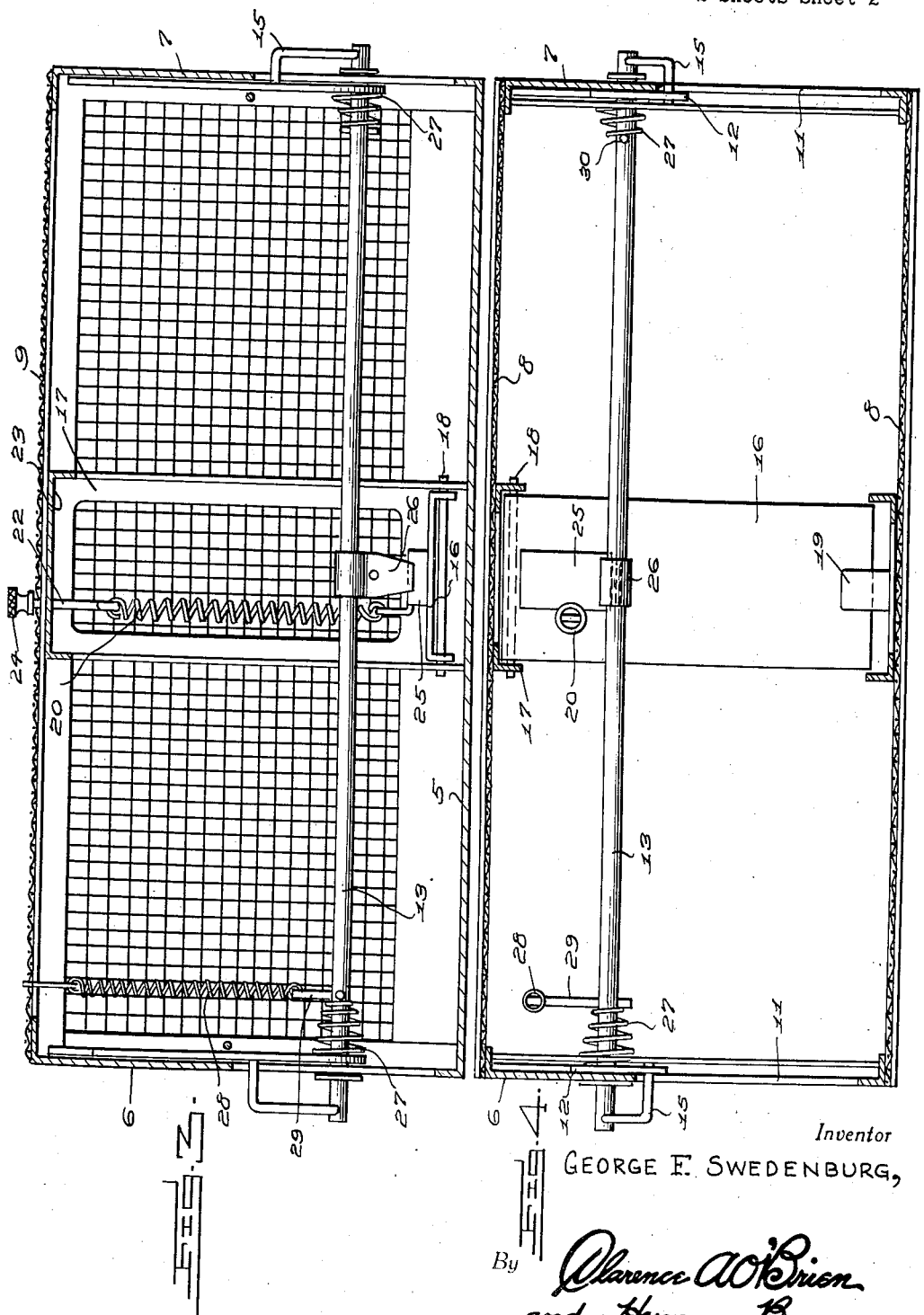
Inventor
GEORGE F. SWEDENBURG,
By Clarence A. O'Brien
and Hyman Berman
Attorneys Patented Jan. 28, 1941

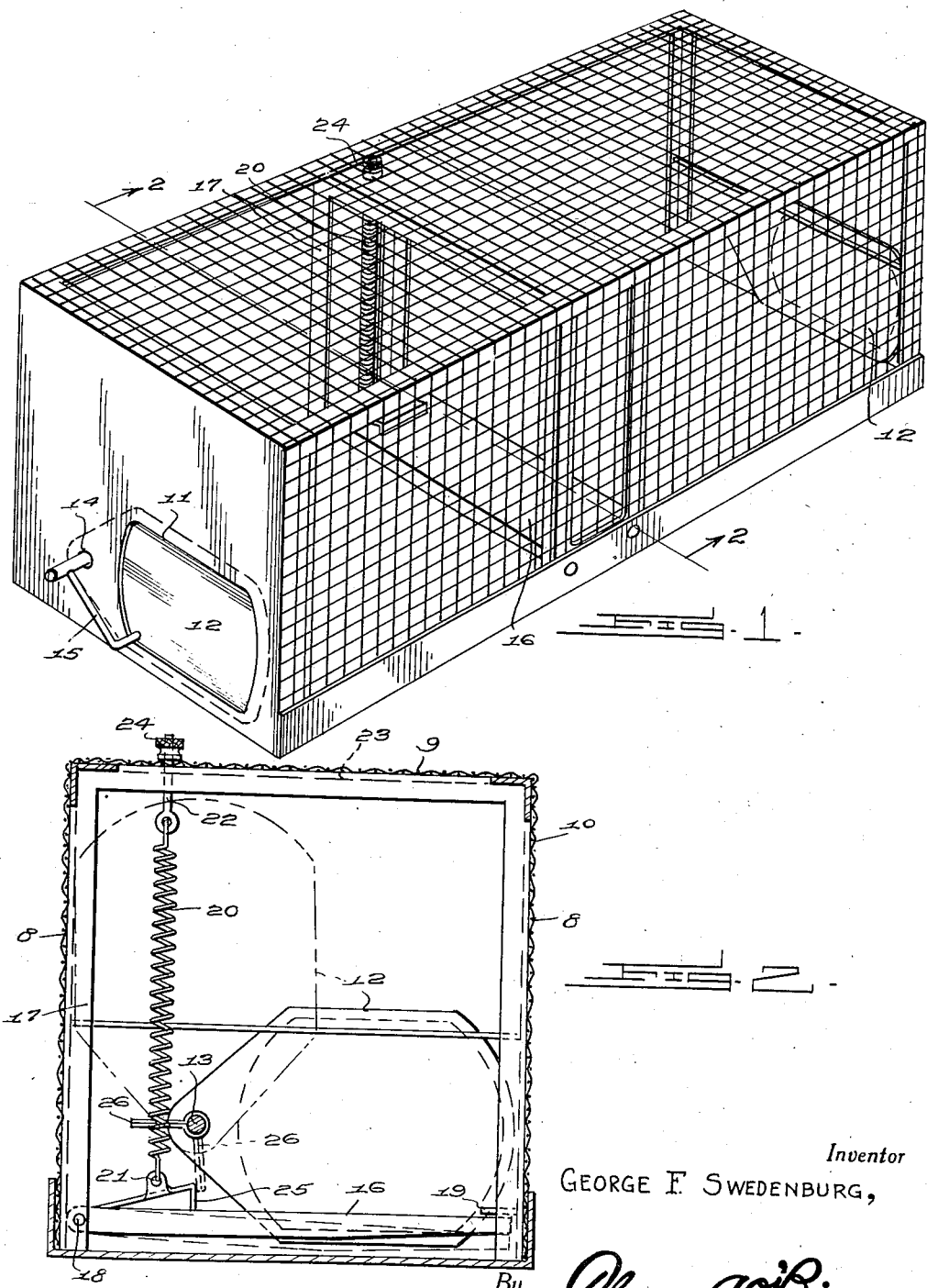

2,229,685

UNITED STATES PATENT OFFICE 2,229,685

RAT TRAP

George F. Swedenburg, Danville, Iowa, assignor of one-half to Lola Swedenburg, Danville, Iowa Application December 6, 1939, Serial No. 307,913

3 Claims. (Cl. 43—61)

This invention relates to traps of the type employed for catching animals and rodents, and an object of the invention is to provide a trap particularly designed for catching rats and mice.

In accordance with the present invention the trap is in the form of a tunnel equipped with closures or doors at the respective opposite ends thereof and means for releasing the doors to permit the latter to move to a closed position, said means to be actuated by the rodents in passing from one end to the other of the tunnel-like structure of the trap.

The invention, together with its objects and advantages will be best understood from a study of the following description taken in connection with the accompanying drawings wherein:

Figure 1 is a perspective view of the trap in fully closed condition.

Figure 2 is a transverse sectional view through the trap taken substantially on the line 2—2 of Figure 1.

Figure 3 is a vertical sectional view taken longitudinally through the trap, and Figure 4 is a horizontal sectional view taken through the trap.

Referring more in detail to the drawings it will be seen that in the preferred embodiment thereof the trap comprises a casing in the form of an elongated substantially rectangular tunnel having a bottom wall 5, end walls 6 and 7, side walls 8, and a top wall 9.

The bottom wall 5 and end walls 6 and 7 are preferably formed of sheet metal or similar material, while the side and top walls are of skeleton frame structure over which is disposed a sheet 10 of screen or other reticulated material.

At a lower corner thereof each end wall 6, 7 is provided with an opening 11 of a size to permit a rodent to pass therethrough into the trap.

For each opening 11 there is provided a vertically swingable door or closure 12, formed of metal or other suitable material.

For the doors 12 there is provided a pivot rod or shaft 13 that is disposed longitudinally of the trap and has the ends thereof journaled in and extending through openings 14 provided therefor in said end walls 6, 7 of the trap.

At the outer ends thereof the shaft or rod 13 is provided with lateral arms 15 that terminate in right-angularly disposed terminals positively secured in any suitable manner to the doors or closures 12 for transmitting rotative movement of the shaft 13 to the doors for swinging the doors to open and closed positions.

Also, in accordance with the present invention there is disposed transversely of the trap intermediate the ends of the trap a pivoted treadle 16. The treadle 16 is pivoted at one end thereof between members 17 of the skeleton frame of the trap adjacent one side wall of the trap as at 18. At the free end thereof the treadle 16 terminates beneath an inwardly directed stop member 19 that is formed integral with or otherwise mounted on the lower member of the skeleton frame at the side of the trap opposite to the pivot 18.

The treadle 16 is normally urged to swing upwardly through the medium of an adjustable tension or spring device which includes a spring 20 anchored at one end thereof to the treadle 16 adjacent the pivoted end of the treadle as at 21 and connected at the opposite end thereof with an eyebolt 22 that extends upwardly through one of the skeleton frame members 23 at the top of the trap and is equipped with a hand-nut 24. Obviously by threading home the nut 24 against the top of the trap the tension on the spring 20 will be increased as may be found desirable.

Adjacent the pivoted end thereof the treadle 16 is provided with a formation 25 that forms a keeper lug with which is cooperable a latch arm 26 mounted on the shaft or rod 13 to rotate therewith.

From the description of the invention thus far it will be seen that to set the trap all that is necessary is, by grasping one of the arms 15 at one end of the trap, to rotate the shaft 13 in a counter-clockwise direction until the arm 26 engages the lug 25 of the treadle 16 as suggested by broken lines in Figure 2. With the trap thus set the doors or closures 12 will remain in an open position permitting a rodent to pass into the trap through an opening 11 at either end thereof.

As the rodent passes through the trap it will necessarily step on the platform 16 causing the latter to be depressed or swung downwardly with the result that the lug 25 will clear the arm 26. When this occurs shaft 13 with the doors 12 will rotate in a clockwise direction, the doors 12 thus swinging down to close the openings 11 and thus prevent exit of the rodent.

The shaft 13 and the doors 12 are normally urged to rotate in a clockwise direction, or to a position where the doors 12 close the openings 11 through the medium of a vertical coil spring 28 that at one end is anchored to the top wall of the trap and at its opposite end is secured to an arm 29 that extends laterally from the shaft 13.

The arm 26 is normally urged into a position for engagement with the lug 25 through the medium of coil springs 27 disposed on the shaft 13 interiorly of the trap, with one spring 27 being interposed between the pivoted end of the door 12 at the end 6 of the trap and the aforementioned arm 29, while the other of the coil springs 27 is interposed between the pivoted end of the door 12 at the end 7 of the trap and a pin 30 on the shaft or rod 13 as clearly shown in Figure 4.

Thus it will be seen that when it is desired to close the trap from the exterior thereof the operator need only push on the shaft 13 longitudinally against the action of springs 27 so as to shift the arm 26 laterally relative to the lug 25 until said arm clears the lug when the shaft 13 is then free to rotate in the proper direction for moving the doors 12 to the lowered or closing position.

In actual practice it might also be well to conceal the trap by throwing a sack or the like thereover, leaving, of course, the openings 11 at the ends of the trap exposed. It might likewise be found well to place in the trap bait such as corn, wheat or oats.

It is thought that a clear understanding of the construction, utility, and advantages of a trap of this character will be had without a more detailed description thereof.

Having thus described the invention what is claimed as new is:

1. A trap of the character described comprising a casing provided with an opening in each end thereof, a shaft rotatably and slidably mounted longitudinally of said casing, a door for each opening mounted on the shaft to rotate therewith for closing its respective opening, a treadle disposed transversely of the casing intermediate the ends thereof and pivoted at one end, a resilient device connected with said treadle normally urging the latter to swing upwardly, a keeper lug on said treadle, an arm on said shaft engageable with said keeper lug and cooperable therewith for releasably retaining the treadle in a raised position and the doors in an open position, said treadle being adapted to swing downwardly in response to the weight of a rodent thereon whereby to clear the lug of said arm for freeing said shaft to permit the latter to rotate in a direction for moving said doors to a closing position with respect to said openings.

2. A trap of the character described comprising a casing provided with an opening in each end thereof, a shaft rotatably and slidably mounted longitudinally of said casing, a door for each opening mounted on the shaft to rotate therewith for closing its respective opening, a treadle disposed transversely of the casing intermediate the ends thereof and pivoted at one end, a resilient device connected with said treadle normally urging the latter to swing upwardly, a keeper lug on said treadle, an arm on said shaft engageable with said keeper lug and cooperable therewith for releasably retaining the treadle in a raised position and the doors in an open position, said rod being shiftable longitudinally to position said arm laterally and clear of said lug to permit swinging of the doors to a closed position by a person exteriorly of the trap.

3. A trap of the character described comprising a casing provided with an opening in each end thereof, a shaft rotatably and slidably mounted longitudinally of said casing, a door for each opening mounted on the shaft to rotate therewith for closing its respective opening, a treadle disposed transversely of the casing intermediate the ends thereof and pivoted at one end, a resilient device connected with said treadle normally urging the latter to swing upwardly, a keeper lug on said treadle, an arm on said shaft engageable with said keeper lug and cooperable therewith for releasably retaining the treadle in a raised position and the doors in an open position, said rod being shiftable longitudinally to position said arm laterally and clear of said lug to permit swinging of the doors to a closed position by a person exteriorly of the trap, and means operatively connected with said shaft and normally urging the latter to rotate in a direction moving the doors to a closing position.

GEORGE F. SWEDENBURG.